(12) United States Patent
Linton et al.

(10) Patent No.: US 10,776,081 B2
(45) Date of Patent: Sep. 15, 2020

(54) SYSTEMS AND METHODS FOR UTILIZING WEBHOOKS INTEGRATED IN PLATFORM-AS-A-SERVICE SUPPORTED APPLICATION DEVELOPMENT AND DEPLOYMENT

(71) Applicant: O.C. Tanner Company, Salt Lake City, UT (US)

(72) Inventors: Trevor Forbes Linton, Salt Lake City, UT (US); Murray Lucas Resinski, Salt Lake City, UT (US); Michael Raymond Felix, Salt Lake City, UT (US); Cory Alexander Christopher, Salt Lake City, UT (US)

(73) Assignee: O.C. Tanner Company, Salt Lake City, UT (US)

( * ) Notice: Subject to any disclaimer, the term of this patent is extended or adjusted under 35 U.S.C. 154(b) by 160 days.

(21) Appl. No.: 15/465,475

(22) Filed: Mar. 21, 2017

(65) Prior Publication Data

US 2018/0275966 A1    Sep. 27, 2018

(51) Int. Cl.
| | |
|---|---|
| *G06F 9/44* | (2018.01) |
| *G06F 8/30* | (2018.01) |
| *G06F 8/71* | (2018.01) |
| *H04L 29/08* | (2006.01) |

(52) U.S. Cl.
CPC .................. *G06F 8/30* (2013.01); *G06F 8/71* (2013.01); *H04L 67/02* (2013.01)

(58) Field of Classification Search
CPC .............................. H04L 67/02; H04L 67/025
See application file for complete search history.

(56) References Cited

U.S. PATENT DOCUMENTS

| | | | | |
|---|---|---|---|---|
| 8,055,758 | B2 * | 11/2011 | Hansen | G06F 11/0748 709/200 |
| 9,582,254 | B2 * | 2/2017 | Krishnamurthy | G06F 8/34 |
| 9,753,784 | B2 * | 9/2017 | Nassaur | G06F 9/5072 |
| 2007/0011295 | A1 * | 1/2007 | Hansen | G06F 11/0748 709/223 |
| 2015/0149634 | A1 * | 5/2015 | Nassaur | G06F 9/5072 709/226 |
| 2015/0339107 | A1 * | 11/2015 | Krishnamurthy | G06F 8/34 717/107 |
| 2017/0083386 | A1 * | 3/2017 | Wing | G06F 9/542 |
| 2017/0214749 | A1 * | 7/2017 | Kanumolu | H04L 67/141 |
| 2017/0366621 | A1 * | 12/2017 | Sagar | H04L 51/02 |

* cited by examiner

*Primary Examiner* — Qamrun Nahar
(74) *Attorney, Agent, or Firm* — Michael F. Krieger; Kirton McConkie (57) ABSTRACT

This invention relates generally to systems, methods, and computer program products that allow developers to build applications supported by Platform as a Service ("PaaS") utilizing integrated webhooks, allowing developers to hook discrete actions into PaaS systems contingent on defined occurrence of requisite triggering events. In some embodiments developers utilize webhooks to invoke a POST method HTTP call with a payload describing the discrete action in response to the requisite triggering event, wherein the actions may be selected from a list comprising: builds, releases, add-on changes, formation changes or scale events, application destruction, logging disconnect actions, logging connect actions, and pipelined builds.

20 Claims, 3 Drawing Sheets

SYSTEMS AND METHODS FOR UTILIZING WEBHOOKS INTEGRATED IN PLATFORM-AS-A-SERVICE SUPPORTED APPLICATION DEVELOPMENT AND DEPLOYMENT

CROSS-REFERENCE TO RELATED APPLICATIONS

Not Applicable.

BACKGROUND

1. Field of the Invention

This invention relates generally to systems, methods, and computer program products associated with platform-as-a-service ("PaaS") environments, and more specifically, that allow developers to build applications supported by Platform-as-a-Service ("PaaS") utilizing integrated webhooks, and that allow developers to hook discrete actions into PaaS systems contingent on the defined occurrence of requisite triggering events.

2. Related Art

Platform as a Service ("PaaS") is a complete development and deployment environment in the cloud, with resources that enable developers to deliver everything from simple cloud-based applications to sophisticated, cloud-enabled enterprise applications. Utilizing PaaS as a development and deployment environment a client purchases the resources they need from a cloud service provider on a pay-as-you-go basis, typically accessing them over a secure internet connection. The PaaS provider hosts the hardware and software on its own infrastructure. As a result, PaaS frees users from having to install in-house hardware and software to develop and run its new applications.

Typically, PaaS does not replace a business' entire infrastructure. Instead, a business relies on PaaS providers for discrete services, for example application development or application hosting. Without utilizing PaaS, deploying a business tool locally may require an IT team to buy and install hardware, operating systems, middleware, the actual application, define user access or security, and then add the application to existing systems management or application performance monitoring tools. IT teams must then maintain all of these resources over time. A PaaS provider, however, supports all the underlying computing and software; clients only need to log in and start using the platform, usually through a Web browser interface.

A webhook in web development is a method of augmenting or altering the behavior of a web page, or web application, with custom callbacks. These callbacks may be maintained, modified, and managed by third-party users and developers who may not necessarily be affiliated with the originating website or application.

Webhooks are "user-defined HTTP callbacks". They are usually triggered by some event, such as pushing code to a repository or a comment being posted to a blog. When that event occurs, the source site makes an HTTP request to the URI configured for the webhook. Developers can configure webhooks to cause events on one site to invoke behavior on another. Since webhooks use HTTP, they can be integrated into web services without adding new infrastructure.

It is desirable to develop PaaS utilization that is more cost effective, and allows for clients to develop and support increasingly complex applications, while decreasing the burden placed on clients to buy and install hardware, operating systems, middleware, etc., associated with providing an infrastructure capable of supporting the development, deployment, and maintenance of an application. Accordingly, it is desirable to decrease the resources utilized by a client to associate with the minimum requisite services required to develop and deploy applications, limiting or eliminating accessing resources unnecessarily in a pay-as-you go fee structure, while simultaneously increasing support for increasingly complex applications, without incurring costs associated with installation and maintenance of hardware, operating systems, middleware, etc.

BRIEF SUMMARY

This invention relates generally to systems, methods, and computer program products that allow developers to build applications supported by a Platform-as-a-Service ("PaaS") environment, and more specifically to providing an environment that supports the use of integrated webhooks, allowing developers to hook discrete actions into PaaS systems contingent on the defined occurrence of requisite triggering events. In some embodiments developers utilize webhooks to invoke a POST method HTTP call with a payload describing the discrete action in response to the requisite triggering event, wherein the actions may be selected from a list comprising: builds, releases, add-on changes, formation changes or scale events, application destruction, logging disconnect actions, logging connect actions, and pipelined builds. In some embodiments web hooks may also be configured to deliver a one-time access code to the system to which it is posting the event. In some embodiments, the one-time access code may be limited to specific event resources. Additional embodiments, may allow the PaaS provider to provide access and integration with supporting system(s). Duration of access to supporting system(s) varies from one embodiment to the next. Accordingly, some embodiments provide only temporary and/or restricted access to certain systems, while other embodiments provide long-term access, and/or unrestricted access to certain systems.

BRIEF DESCRIPTION OF THE DRAWINGS

The specific features, aspects and advantages of the present invention will become better understood with regard to the following description and accompanying drawings where.

DETAILED DESCRIPTION

Embodiments of this invention relate generally to systems, methods, and computer program products that allow developers to build applications supported by a Platsform-as-a-Service ("PaaS") environment. In some embodiments, an environment is provided to support utilizing integrated webhooks; allowing developers to hook discrete actions into PaaS systems contingent on the defined occurrence of requisite triggering events.

In the following description of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Where appropriate embodiments of various function described herein utilize the World Wide Web and HTTP, which are based on a number of request methods including POST and GET as well as PUT, DELETE, and several others. Web browsers normally use only GET and POST, but RESTful online apps make use of many of the others. POST's place in the range of HTTP methods is to send a representation of a new data entity to the server so that it will be stored as a new subordinate of the resource identified by the URI. For example, for the URI http://example.com/customers, POST requests might be expected to represent new customers, each including their name, address, contact details and so on. In computing, POST is a request method supported by the HTTP protocol used by the World Wide Web. By design, the POST request method requests that a web server accept the data enclosed in the body of the request message. As part of a POST request, an arbitrary amount of data of any type can be sent to the server in the body of the request message. A header field in the POST request usually indicates the message body's Internet media type.

This invention relates generally to systems, methods, and computer program products that allow developers to build applications supported by a Platform as a Service ("PaaS") environment. Embodiments utilize a PaaS environment structured to support integrated webhooks, allowing developers to hook discrete actions into PaaS systems contingent on defined occurrence of requisite triggering events. In some embodiments developers utilize webhooks to invoke a POST method HTTP call with a payload describing the discrete action in response to the requisite triggering event, wherein the actions may be selected from a list comprising: builds, releases, add-on changes, formation changes or scale events, application destruction, logging disconnect actions, logging connect actions, and pipelined builds.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Figure 1:
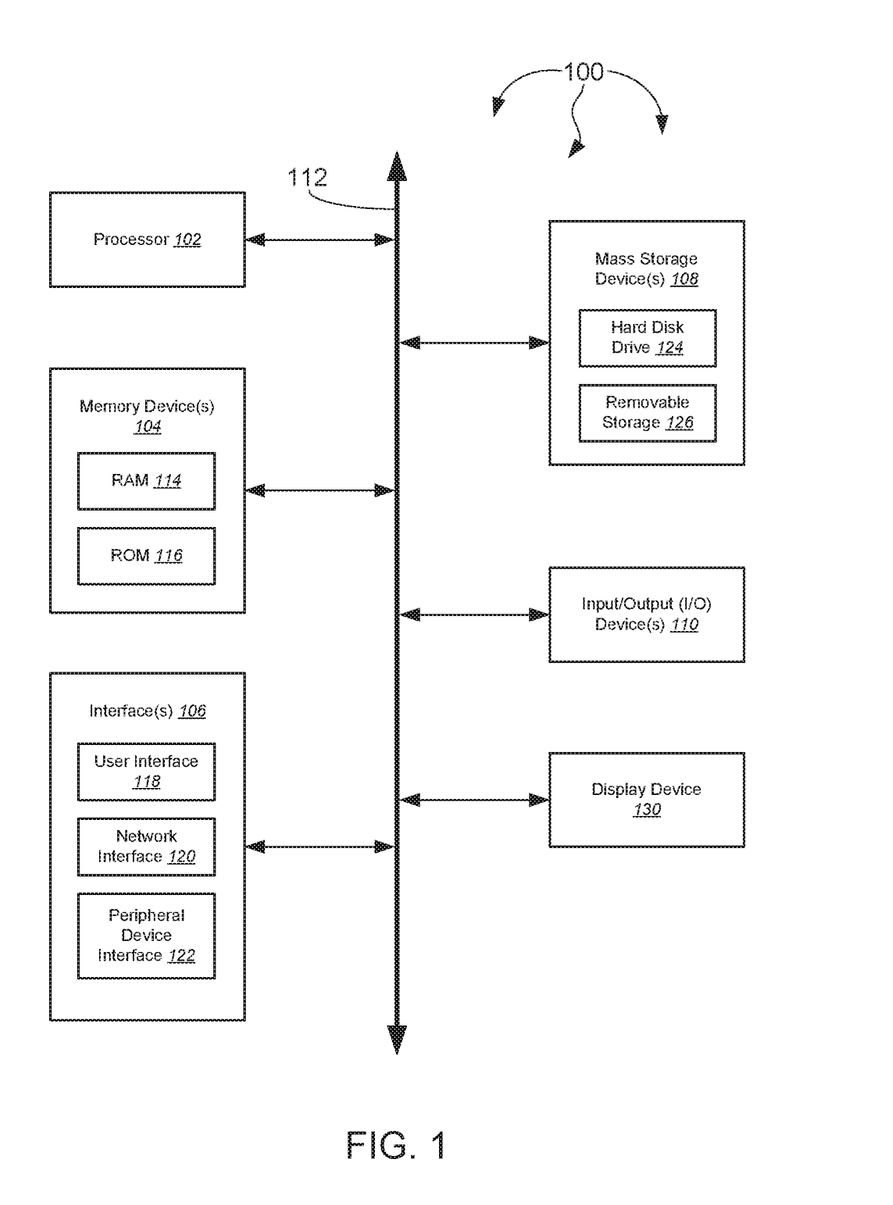
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
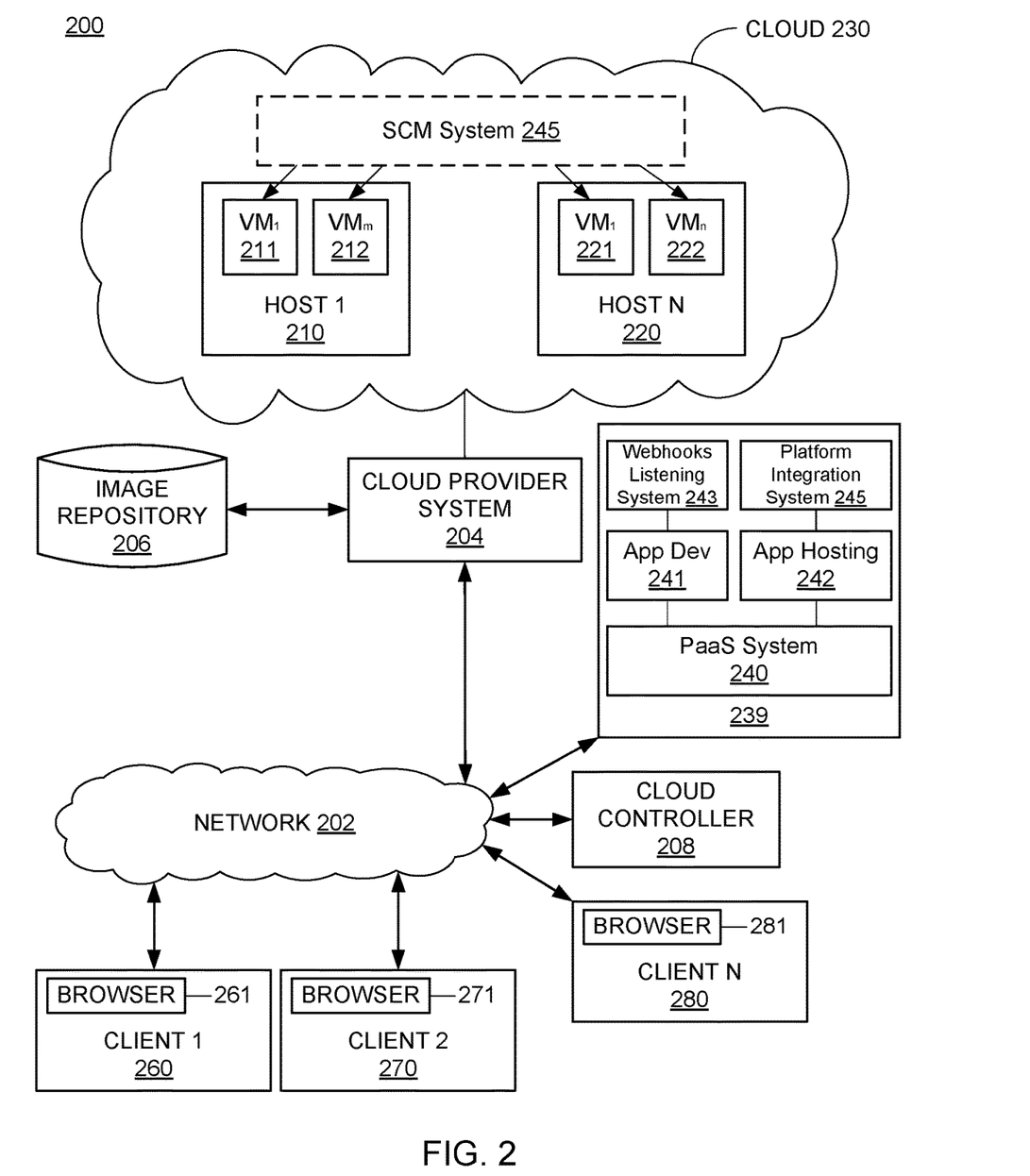
FIG. 2 illustrates an example computer architecture that facilitates PaaS environment for supporting development and hosting of applications.

FIG. 2 is a block diagram of a network architecture 200 in which embodiments of the disclosure may operate. The network architecture 200 includes a cloud 230 managed by a cloud provider system 204. The cloud provider system 204 provides virtual machines (VMs), such as VMs 211, 212, 221, and 222 hosted in cloud 230. Each VM is hosted on a physical machine, which may comprise some or all of the physical elements described in FIG. 1, such as host 1 210 through host N 220, configured as part of the cloud 230. In some embodiments, the host machines 210, 220 are often located in a data center. For example, VMs 211 and 212 are hosted on physical machine 210 in cloud 230 provided by cloud provider 204. Users can interact with applications executing on the cloud-based VMs 211, 212, 221, 222 using client computer systems, such as clients 260, 270 and 280, via corresponding web browser applications 261, 271 and 281.

Clients 260, 270 and 280 are connected to hosts 210, 220 and the cloud provider system 204 via a network 202, which may be a private network (e.g., a local area network (LAN), a wide area network (WAN), intranet, or other similar private networks) or a public network (e.g., the Internet). Each client 260, 270, 280 may be a mobile device, a PDA, a laptop, a desktop computer, or any other computing device. Each host 210, 220 may be a server computer system, a desktop computer or any other computing device. The cloud provider system 204 may include one or more machines such as server computers, desktop computers, etc.

In one embodiment, the cloud provider system 204 is coupled to a cloud controller 208 via the network 202. The cloud controller 208 may reside on one or more machines (e.g., server computers, desktop computers, etc.) and may manage the execution of applications in the cloud 230. In some embodiments, cloud controller 208 receives commands from a Platform-as-a-Service system 240. Based on these commands, the cloud controller 208 provides data (e.g., such as pre-generated images) associated with different applications to the cloud provider system 204. In some embodiments, the data may be provided to the cloud provider 204 and stored in an image repository 206, in an image repository (not shown) located on each host 210, 220, or in an image repository (not shown) located on each VM 211, 212, 221, 222.

In one embodiment, each VM 211, 212, 221, 222 running applications for the PaaS system 240 includes a source code management (SCM) system 245, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. SCM system 245 on VMs 211, 212, 221, 222 stores the remote repositories for each application running on the VM 211, 212, 221, 222, so that the application code may be edited by others with access, or the application may be executed by the VM 211, 212, 221, 222.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 206 may run directly on a physical host 210, 220 instead of being instantiated on a VM 211, 212, 221, 222.

FIG. 2 illustrates an example computer architecture 200 that facilitates allowing developers to build applications on a PaaS system 240 with webhooks. Referring to FIG. 2, computer architecture 200 includes PaaS provider server system 239 comprising PaaS server system 240, application development system 241, application hosting system 242, and webhook listener system 243, and client systems 260, 270, 280. Provider server system 239 and client systems 260, 270, 280 can comprise any type and number of computing components or devices. For example, provider server system 239 can represent a number of interconnected computing components forming a cloud. Also, client systems 260, 270, 280 can represent a desktop computer, laptop computer, smart phone, etc.

Each of the depicted systems can be connected to one another over (or be part of) the network 202, such as, for example, a PAN, a LAN, a WAN, and even the Internet. Accordingly, each of the depicted devices and computer systems as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Server system 239 provides a PaaS application development and hosting system 240, 242 that can be accessed by client systems 260, 270, 280. The PaaS application development and hosting system 240, 242 can include one or more services. In some embodiments, PaaS application development and hosting 240 includes an application development system 241 and an application hosting system 242.

Client systems 260, 270, 280 may provide a user interface or browser 261, 271, 281 allowing developers to login to provider's server system 239 accessing application development system 241 to create a new application designed for client systems 260, 270, 280 or third party end-user systems.

Generally, server system 239 allows developers to create the various modules required to provide client systems 260, 270, 280 or third party end-user systems with a fully functional application hosted by provider on the server system 239. In some embodiments developer(s) are enabled to build applications on PaaS, hosted by provider's server system 239, wherein the applications are designed to allow the applications to access the application hosting system 242 via the network 202 through webhooks.

In some embodiments, a platform integration webhooks system 243 allows developers to create applications that comprise hooks for separate actions if other actions or events occur. In various embodiments, hooks may comprise a POST method HTTP call with a payload describing the event for one or more of the actions/events selected from a list comprising: builds, releases, add-on changes, formation changes (scale events), application destruction, logging disconnect/connect actions and pipelined builds. To create a webhook in some embodiments, developers configure a module of their application with a webhook with a payload describing the event.

In some embodiments, webhooks comprise HTTP callbacks that receive notification messages at the server system 239 for events occurring on client systems 260-280 or end-user systems, and may be processed by a platform integration webhooks system 243 and an application hosting system 242. In some embodiments, application hosting system 242 comprises a webhook listener system 243, which is a server that listens at a specific URL for incoming HTTP POST notification messages, webhook requests that are triggered when events occur. Application hosting system 242 provides content or service for each webhook request delivered to a webhook listener.

For example, in some embodiments, a developer may utilize client system 260 to build an application comprising a module for at least one of the actions selected from a list comprising: builds, releases, add-on changes, formation changes, scale events, application destruction, logging disconnect actions, logging connect actions, and pipeline builds. Instead of coding for the module, the developer may write a php or ruby script for a webhook to access code for a specific action from the provider, should an event trigger the need for the specific action to be taken. In some embodiments, the code for the selected action may be present on a SCM system 245. The developer puts the "call" of the webhook in the module of the application resident on the SCM system 245 located in the cloud 230 comprising server system 239 with no need to code for that specific action. Server system 239 receives the call.

In some embodiments, when an event triggers the specific action (e.g., application traffic exceeds a set volume requiring a build out), webhook listener server 243 receives a notification, and application hosting server 242 performs HTTP POST with code required to execute the requested action. Instead of having a specific protocol and a client implementation that executes the semantics of that protocol, client has an open ended system. Accordingly, some embodiments comprise event driven programming, wherein writing webhooks are writing event handlers. Client then receives "call-back" through HTTP POSTs containing the code for the selected action from application hosting server 242 and SCM system 245 only when a specific action must be executed.

Accordingly, in some embodiments the developer codes for applications with modules that request for the code required to execute the module's action only when an event requires that module's action to transpire. These modules sit and wait on the SCM system to be called. Then, an event signals a webhooks listener and webhooks can "activate" the whole integration workflow to provide the code stored on the SCM system 245 for the requisite action and execute the requisite action. In preferred embodiments, activation happens for a reason (e.g., code for build out accessed by application only if application traffic volume exceeds a threshold volume), not just because it's time to make another check to see if traffic volume has increased, requiring a buildout action. In some embodiments, this provides client's application and services with real-time coding for actions in response to specific events.

In some embodiments, web hooks may also be configured to deliver a one-time access code to a system(s) it is posting the event to. In some embodiments, the one-time access code may be limited to specific event resources. In other embodiments, the access code may provide access and integration with the supporting system(s) for a limited period of time. Additional embodiments, may allow the PaaS provider to allow access and integration with a limited and specified system(s) and only for a defined duration of time. Duration of access to supporting system(s) varies from one embodiment to the next. Accordingly, some embodiments provide only temporary and/or restricted access to certain system(s), while other embodiments provide long-term access, and/or unrestricted access to certain systems.

For example, in some embodiments a webhook may be configured to deliver a one-time access code to the system it is posting the event to. The one-time access code may be limited to specific event resources, and/or provide access and integration with supporting system(s) for a designated period of time (e.g., 10 seconds, 30 seconds, 60 second, 90 seconds, two minutes, three minutes, four minutes, five minutes, etc.). Additionally, some embodiments may utilize a one-time access code that provides access and integration with supporting system(s) for the system it is posting the event to that are limited to the system(s) requisite to the triggering event, and/or may limit the duration of time the system being posted to has access an integration with the additional supporting system(s). For example, an embodiment may comprise a webhook that only has the ability to roll back a release on a specific application for the next 60 seconds, in contrast to some embodiments that utilize long-lived access codes, and/or ubiquitous access and integration with supporting system(s). Accordingly, developers may design webhooks that are tailored to the specific operational needs of the system being posted to, as well as design webhooks in a way that expands the PaaS providers' ability to provide an increased variety of platforms, more effectively matching the consumers' system needs and budgetary constraints.

Figure 3:
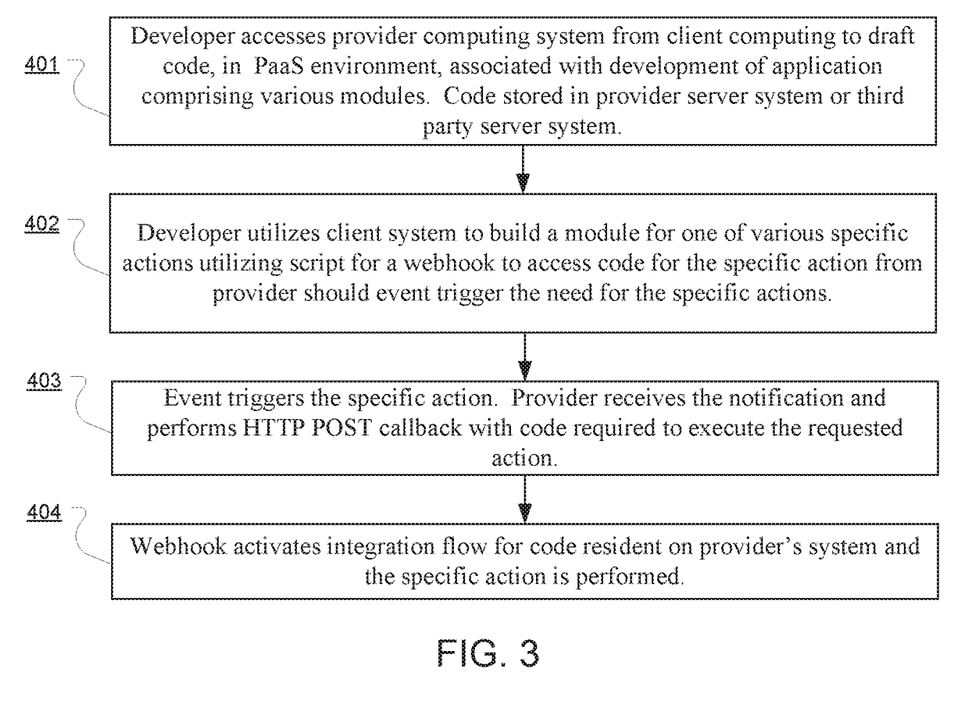
FIG. 3 illustrates a flow chart of an example method for developing and hosting an application in a PaaS environment wherein at least one of the modules of the application consists of a webhook for accessing code for an action triggered by and event.

FIG. 3 illustrates a flow chart of an example method 400 that allows developers to build applications supported by a Platform as a Service ("PaaS") environment structured to support integrated webhooks, allowing developers to hook discrete actions into PaaS systems contingent on defined occurrence of requisite triggering events. In some embodiments developers utilize webhooks to invoke a POST method HTTP call with a payload describing the discrete action in response to the requisite triggering event, wherein the actions may be selected from a list comprising: builds, releases, add-on changes, formation changes or scale events, application destruction, logging disconnect actions, logging connect actions, and pipelined builds.

Method 400 will be described with respect to the components and data of computer architecture 200.

Method 400 includes Step 401 receiving, from one of a client computer system 260, 270, 280 code associated with the development of an application comprising various modules requisite for running the application through PaaS system 240 and application development system 241. Developer may utilize browser 261, 271, 281, and/or host 210, 220 to access PaaS supported environment 240 for developing application. Code drafted by developer may be stored on a SCM system 245.

In step 402 according to some embodiments, developer utilizes client system 260, 270, 280 to build an application comprising a module for at least one of the actions selected from a list comprising: builds, releases, add-on changes, formation changes, scale events, application destruction, logging disconnect actions, logging connect actions, and pipeline builds. Instead of coding for the module, the developer writes a php or ruby script for a webhook to access code for specific action from provider, should an event trigger the need for the specific action to be taken. In some embodiments, the code for the selected action may be present on a SCM system 245. The developer puts the "call" of the webhook in the module of the application resident on the SCM system 245 located in the cloud 230 comprising server system 239 with no need to code for that specific action. Server system 239 receives the call.

In step 403 according to some embodiments, when an event triggers the specific action (e.g., application traffic exceeds a set volume requiring a build out), webhook listener server 243 receives a the notification, and application hosting server 242 performs HTTP POST with code required to execute the requested action. Instead of having coded a specific protocol and a client implementation that executes the semantics of that protocol, client has an open ended system. Accordingly, some embodiments comprise event driven programming, wherein writing webhooks are writing event handlers. Client then receives "call-back" through HTTP POSTs containing the code for the selected action from application hosting server 242 and SCM system 245 only when a specific action must be executed.

Accordingly, in some embodiments the developer codes for applications with modules that requests the code required to execute the module's action only when an event requires that modules action to transpire. These modules sit and wait on SCM system to be called. Then, an event signals webhooks listener and webhooks can "activate" the whole integration workflow to provide the code stored on the SCM system 245 for executing the requisite action and in Step 404 execute the requisite action. In preferred embodiments, activation happens for a reason (e.g., code for build out accessed by application only if application traffic volume exceeds a threshold volume), not just because it's time to make another check to see if traffic volume has increased, requiring a buildout action. In some embodiments, this provides client's application and services with real-time coding for actions in response to specific events.

Although the components and modules illustrated herein are shown and described in a particular arrangement, the arrangement of components and modules may be altered to process data in a different manner In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A system for application development supported by a Platform-as-a-Service (PaaS) environment comprising:
    a provider server system comprising a PaaS system structured to provide an application development system and an application hosting system, wherein the provider server system is structured to allow a developer to create modules required to provide an application hosted by the provider server system;
    a code management system structured to store a first code and scripts associated with execution of a first action required to execute the application;
    a client system comprising a user interface structured to allow the developer to login to the provider server system;
    a platform integration webhook system resident on the provider server system structured to allow the developer to create a module for the application, each module made of a webhook to invoke a POST method HTTP call having a payload of the code for the first action which is triggered by a first event; and
    an application hosting system resident on the provider computing system structured to receive a notification message that is triggered when a first event occurs on the client system, wherein first code for the first action is only accessed by the application upon occurrence of the first event on the client system that requires the use of the first code associated with the first action.

2. The system of claim 1, wherein the code provided by the application hosting system codes for the action selected from a list comprising: builds, releases, add-on changes, formation changes, scale events, application destruction, logging disconnect/connect actions and pipelined builds.

3. The system of claim 1, wherein the code for the first action may be present on a Source Code Management (SCM) system, wherein the developer writes a script for the webhook in the module of the application resident on the SCM system located in the cloud with no need to code for that specific action.

4. The system of claim 1, further comprising a webhook listener server resident on the application hosting server, structured to receive the notification, and the application hosting server performing HTTP POST with code required to execute the requested first action.

5. The system of claim 4, wherein the webhook listener system is structured to listen at a specific URL for incoming HTTP POST notification messages that are triggered when the first event occurs on the client system.

6. The system of claim 1, wherein code for a specified first action provides access and integration to a supporting system for a finite amount of time.

7. The system of claim 6, wherein the finite amount of time is selected from a list consisting of: 10 seconds, 20 seconds, 30 seconds, 40 seconds, 50 seconds, one minute, 1.5 minutes, 2 minutes, 3 minutes, 4 minutes, and 5 minutes.

8. The system of claim 1, wherein code for the first action provides access to only selected supporting systems for a finite amount of time.

9. At a computer system, a method for allowing a developer to build an application supported by a Platform-as-a-Service ("PaaS") environment, wherein the PaaS environment is structured to support integrated webhooks, the method comprising the steps of:
    building the application utilizing a client system;
    allowing a developer to hook discrete actions into PaaS systems contingent on a defined occurrence of requisite triggering events, wherein the developer writes a script for a first webhook to access a first code for a first action, wherein the first action is triggered by a first event;
    receiving a notification at an application hosting server that the first event has occurred;
    performing HTTP POST call back from the application hosting server, with code required to execute the first action; and
    receiving a call-back through a HTTP POST containing the first code for the first action from the application hosting server only when the first action must be executed.

10. The method of claim 9, further comprising: utilizing webhooks to invoke a POST method HTTP call-back, wherein the POST method HTTP call-back comprises a payload of code describing the discrete action in response to the requisite triggering events.

11. The method of claim 10, wherein the actions may be selected from a list comprising: builds, releases, add-on changes, formation changes or scale events, application destruction, logging disconnect actions, logging connect actions, and pipelined builds.

12. The method of claim 9, wherein the method further comprises: receiving, from the client computer system second code associated with the development of the application comprising various modules requisite for running the application through a PaaS system application development system.

13. The method of claim 12, wherein the developer may utilize a browser to access PaaS supported environment for developing application.

14. The method of claim 13, further comprising the step of storing said first or second code drafted by the developer on a Source Code Management (SCM) system.

15. The method of claim 14, further comprising the step of scripting a call of the first webhook in a module built into the application resident on the SCM system, located in the cloud with no need to code for that specific action.

16. The method of claim 9, further comprises the step of delivering a one-time access code to the system the HTTP POST call back is being received by, after the notification at an application hosting server that the first event has occurred in the application.

17. The method of claim 16, wherein the one-time access code is limited to specific event supporting resources.

18. The method of claim 17, wherein the one-time access code restricts access and integration with the supporting resources to a defined period of time.

19. The method of claim 18, wherein the one-time access code provides access to a specific and limited set of supporting resources for a restricted amount of time, where the amount of time is selected from a list consisting of: 10 seconds, 20 seconds, 30 seconds, 40 seconds, 50 seconds, one minute, 1.5 minutes, 2 minutes, 3 minutes, 4 minutes, and 5 minutes.

20. At a computer system, a method for allowing a developer to build an application supported by a Platform as a Service ("PaaS") environment comprising the steps of:
providing a platform integration webhook system resident on a provider server system structured to allow a developer to script a webhook structured to access a first code stored in a cloud for a first action in an application, wherein said first action is only required when a first event occurs on a client system;
sending a notification from the client system to a provider application hosting system when the first event occurs;
sending a POST method HTTP call-back with a second code payload comprising second code for the first action;
activating an integration workflow associated with the first action, wherein activation occurs in response to the first event on the client system, thereby providing the application running on the client system with real-time coding for actions in response to specific events.

\* \* \* \* \*